2,823,166
CHOLINE ASCORBATE, METHODS FOR PRODUCING SAME, AND COMPOSITIONS THEREOF

Walter H. Hoffman, Springfield, Mo.

No Drawing. Application November 17, 1954
Serial No. 469,560

12 Claims. (Cl. 167—81)

This invention relates to a novel derivative of ascorbic acid, and, more particularly, to a choline derivative of levo-ascorbic acid hereinafter designated as choline ascorbate. The invention further relates to methods for preparing choline ascorbate, and to stable therapeutic or nutrient compositions containing choline ascorbate.

Ascorbic acid, better known as vitamin C, is one of the essential dietary factors and is frequently applied in the fields of nutrition and medicine. However, it suffers the disadvantage of being easily oxidized and is relatively unstable on storage. Moreover, ascorbic acid has been found to be incompatible with certain other vitamins and therapeutic agents with which it would otherwise provide a desirable combination for supplying several dietary or therapeutic needs. It has been substantially impossible to prepare a suitable parenteral solution of ascorbic acid either alone or in combination with other vitamins. For example, parenteral preparations containing vitamin B–12 and ascorbic acid were found to be unstable and incompatible, resulting in dysfunction of the former and rapid loss of activity of both constituents.

Choline is also an essential dietary component and is often classified as a member of the B-complex group of vitamins. Its chief physiological function is predicated on the fact that it is the parent substance from which acetylcholine is formed by enzymatic action, the latter being of fundamental importance for the normal functioning of the nervous system. Choline is also considered important in the maintenance of normal fat transport in the body and its therapeutic administration has proved invaluable in the prophylaxis and treatment of arteriosclerosis.

Accordingly, an object of the present invention is to produce and to provide methods of producing a derivative of ascorbic acid which is relatively stable under storage conditions and is compatible with other constituents of therapeutic or nutrient compositions in which an ascorbic acid factor is desirable.

Another object of the invention is to produce and provide methods for producing a novel stable compound containing both ascorbic acid and choline factors.

Another object of the invention is to produce and provide methods of producing choline ascorbate.

Another object of the invention is to provide a stable solution containing an ascorbic acid factor which is suitable for parenteral use.

Another object of the invention is to provide a stable therapeutic or nutrient composition containing choline ascorbate and vitamin B–12 and/or other therapeutic agents and vitamins.

It has been discovered that choline ascorbate, prepared in accordance with the present invention, has a much better stability in solution and greater compatibility with other therapeutic agents and vitamins than ascorbic acid from presently available sources. Accordingly, the novel compound represents a new and advantageous source of ascorbic acid, and enables this important vitamin to be more widely used than heretofore possible. Moreover, the presence of the choline factor in the compound provides a single source of two important vitamins, and the compound is more desirable from the standpoint of stability and compatibility with other therapeutic agents than the basic constituents from which it is formed.

According to the invention, choline ascorbate is prepared by reacting ascorbic acid with a choline base, or with reactants which form a choline base, in the presence of a suitable non-reactive solvent medium. The solvent medium may be any of a number of well known commercial solvents including water, the lower alcohols, and non-polar solvents such as acetone, lactones, and esters. While the choice of solvent medium is not particularly critical, methanol is preferred because of its ready availability and ease of separation by distillation at low temperatures.

A suitable choline base may be prepared by the reaction of trimethylamine, ethylene oxide, and water in known manner, and this may be employed in the reaction with ascorbic acid. Alternatively, the choline base forming constituents may be reacted directly with ascorbic acid. In this method the ascorbic acid is first neutralized with trimethylamine and then further reacted with ethylene oxide. The reactants are preferably employed in substantially equimolar quantities and both reactions result in substantially quantitative yields of the mono-choline salt of ascorbic acid.

The use of a greater than equimolar quantity of choline or choline-forming constituents appears to have no effect upon the reaction other than to decrease the product yield.

The product is a heavy viscous liquid having a molecular weight of 279.28. It is quite soluble in water, sorbitol, and in other solvents and forms stable solutions either alone or mixed with other therapeutic agents or vitamins such as vitamin B–12, thiamine hydrochloride, riboflavin, sodium pantothenate, and niacinamide as hereinafter disclosed.

Stable aqueous solutions suitable for therapeutic use may be prepared containing, for example, sufficient choline ascorbate to provide from about 10 milligrams per cubic centimeter to 500 milligrams or more of ascorbic acid (based upon an ascorbic acid content of 56.8%). To these solutions may be added other vitamins in substantially any desired quantity, depending upon the extent of their solubility in the solvent employed, without adverse effect by reason of the choline ascorbate and, without materially decreasing the shelf life of the composition. For example, aqueous solutions may be prepared containing choline ascorbate to provide from about 10 milligrams to about 500 milligrams of ascorbic acid, and from about 1 microgram to about 1 milligram of vitamin B–12 and other B complex vitamins. Sorbitol, or other organic solvents may be used in place of water.

The invention will be described in greater detail in conjunction with the following specific examples. It should be understood however that these examples are given merely by way of illustration, and not by way of limitation.

EXAMPLE I 121.18 mgs. (1.0 mole) of freshly prepared choline base is dissolved in 500 cc. of methanol. To this is added 183 gms. (1.04 mole) of ascorbic acid which has been suspended in 200 cc. of methanol. The solution is treated with carbon and filtered, then vacuum distilled to remove methanol and water. A yield of 270 gms. of choline ascorbate (97.0%) was obtained.

EXAMPLE II 183 gms. (10.4 mole) of ascorbic acid is suspended in 300 cc. of methanol and neutralized with a solution of 60.0 gms. (1.0 mole) of the methylamine in 200 cc. of methanol, while using external cooling to maintain the temperature below 35° C. The reaction mixture is then transferred to a flask equipped with a brine-cooled condenser, and a solution of 48.4 gms. (1.10 mole) of ethylene oxide in 200 cc. of methanol is slowly added while maintaining the temperature between 45–60° C. After addition is completed, the solution is carbon treated and filtered, then vacuum distilled to remove methanol. A yield of 270 gms. of choline ascorbate (97.0%) was obtained.

The product as produced by the above examples was determined by analyses to be a new compound, monocholine ascorbate, having the following formula:

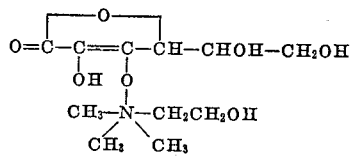

The choline content was determined by precipitation as a Reineckate in an acid medium, dissolving the Reineckate salt in a solvent and determining the quantitative content spectrophotometrically at a wave length of 525 millimicrons. Ascorbic acid was determined by iodine titration. Nitrogen determinations were conducted by the classic Kjeldahl method. Moisture determinations were made by the Karl-Fischer technique. The results of one such analyses are listed in Table I below:

*Table I*

|  | Theoretical | Found As is Basis | Found Dry Basis |
|---|---|---|---|
| Choline Content _____ percent__ | 43.39 | 38.0 | 43.7 |
| Ascorbic Acid Content _____ do__ | 63.06 | 56.8 | 65.4 |
| Total Nitrogen Content _____ do__ | 5.01 | 4.35 | 5.01 |
| Moisture Content _____ do__ |  | 13.1 |  |
| pH Value (2.5% Solution) |  | 6.0 |  |

It will be noted that the results of analyses compare favorably with the theoretical content, within the margin of experimental error.

The chemical and physical properties of the new compound are further summarized below:

Choline ascorbate—$C_{11}H_{21}O_7N$

1. Physical property _____ Heavy viscous liquid.
2. Color _____ Colorless.
3. Taste _____ Bitter.
4. Molecular weight _____ 279.28.
5. Choline content _____ Theoretical choline base— 43.39%.
6. Ascorbic acid _____ Theoretical—63.06%.
7. Nitrogen content _____ 5.01%.
8. Specific gravity (25°/25° C.) _____ 1.32.
9. Specific rotation:
    (10% solution) _____ 66.9.
    (50% solution) _____ 71.5.
10. Reaction:
    (pH 2.5% solution) _____ 6.00.

The following examples are illustrative of a number of compositions that may be prepared from choline ascorbate, and further show the advantageous features of stability and compatibility of this compound as compared with ascorbic acid.

EXAMPLE III

Four solutions were prepared by dissolving sufficient choline ascorbate in distilled water to yield an ascorbic acid equivalent of 10 mg./cc., 25 mg./cc., 50 mg./cc. and 100 mg./cc. respectively in a total volume of 100 cc. of solution. Methyl-parahydroxy-benzoate (Methylparaben) 0.15% and propyl parahydroxy-benzoate (Propylparaben) were employed as preservatives. The ascorbic acid content was determined by the iodine titration procedure immediately after the solutions were prepared and another determination was conducted after storage at 550 hours at 45° centigrade. Stability results are reported in Table II following:

*Table II*

STABILITY OF CHOLINE ASCORBATE AT ACCELERATED STORAGE TEMPERATURE

| Solution No. | 1 | 2 | 3 | 4 |
|---|---|---|---|---|
| Ascorbic Acid Content ___ mg./cc__ | 10 | 25 | 50 | 100 |
| Choline Ascorbate used (based on 56.8% as Ascorbic Acid) ___ grams__ | 1.768 | 4.404 | 8.808 | 17.620 |
| Solvent, Volume | (¹) | (¹) | (¹) | (¹) |
| Initial Ascorbic Acid Content mg./cc__ | 10.0 | 25.1 | 50.1 | 106.6 |
| Storage Assay-Ascorbic Acid Content ___ mg./cc__ | 9.4 | 23.9 | 49.0 | 105.3 |
| Percent Ascorbic Acid Loss on Storage | 6.0 | 4.8 | 2.2 | 1.4 |

¹ Water, q. s., 100 cc.

The above results indicate that choline ascorbate is stable in solution for 550 hours at 45° C., these conditions being comparable to one year shelf life at normal temperatures.

EXAMPLE IV

Duplicate solutions, comparable to 1, 2, 3 and 4 were prepared and 10 micrograms per cc. of vitamin B–12 were added to ascertain whether these compounds were compatible. Initial assays were conducted and the samples were placed under accelerated storage conditions (temp. 45° C.) for 550 hours and then reassayed. The results of this experiment are shown in Table III:

*Table III*

| Solution No. | 1 | 2 | 3 | 4 |
|---|---|---|---|---|
| Ascorbic Acid Content as Choline Ascorbate ___ mg./cc__ | 10 | 25 | 50 | 100 |
| B-12 added ___ mcg./cc__ | 10 | 10 | 10 | 10 |
| Initial Ascorbic Acid Content (by Iodine Titration) ___ mg./cc__ | 10.0 | 25.9 | 50.7 | 99.3 |
| Ascorbic Acid Content after storage at 45. C. for 550 hours ___ mg./cc__ | 9.5 | 24.3 | 49.3 | 97.8 |
| Percent Loss of Ascorbic Acid on Storage | 5 | 6.2 | 3.8 | 15 |
| Initial Vitamin B-12 Content by microbiological assay ___ mcg./cc__ | 10.9 | 10.9 | 10.9 | 10.9 |
| Vitamin B-12 Content after Storage ___ mcg./cc__ | 11.0 | 10.4 | 9.2 | 10.6 |
| Percent B-12 Loss on Storage | None | 4.5 | 15.5 | 2.8 |

The results given in Table III indicate that choline ascorbate is compatible with vitamin B–12 and that the stability of the compounds is maintained within satisfactory limits when the composition is stored at 45° C. for 550 hours, these conditions being equivalent to a shelf life of one year at normal temperature.

EXAMPLE V

A third test series was conducted by preparing solutions of choline ascorbate, equivalent in ascorbic acid content to 50 mg./cc. Solutions of commercially available ascorbic acid were also prepared in the same concentration. To these solutions were added 10 mcg. of vitamin B–12, as well as other vitamins in the B-complex, namely, thiamine hydrochloride, riboflavin, sodium pantothenate and niacinamide. Initial assays were conducted and the samples were placed at accelerated storage temperature (45° C.) for 550 hours, at which time they were re-assayed. Results are shown in Table IV.

Table IV

| Solution No. | 1 | 2 | 3 | 4 |
|---|---|---|---|---|
| Ascorbic Acid, U. S. P. mg./cc. | 50 | | 50 | |
| Choline Ascorbate Equivalent mg./cc. | | 50 | | 50 |
| Vitamin B-12 [1] Crystalline mcg./cc. | 9.7 | 9.7 | 9.7 | 9.7 |
| Solvent Used | [2] | [2] | [3] | [3] |
| Percent Ascorbic Acid Loss on Storage | 18.0 | 2.6 | 51.1 | 4.7 |
| Percent Vitamin $B_1$ Loss on Storage | 27.0 | None | 100 | 6.2 |

[1] Plus other factors of the B-complex.
[2] 70% sorbitol.
[3] Water.

Table IV clearly illustrates that choline ascorbate offers a stable form of ascorbic acid and is compatible with vitamin B-12 and other factors of the B-complex. By comparison commercially available ascorbic acid is substantially completely incompatible with vitamin B-12 and the solutions are unstable and consequently impractical for therapeutic formulation.

Choline ascorbate in addition to its usage in applications wherein ascorbic acid or choline factors have been indicated, is believed to be of particular importance as a therapeutic agent in the management of arteriosclerosis. Thus, the action of the normal fat transport of choline to keep the fat mobilized and counteract stress on the arterial wall, in combination with the action of ascorbic acid on the ground substance of the arterial intima, provides an extremely effective agent in the management of this impairment.

It will be apparent that applicant has provided a novel and useful new compound and compositions thereof, and has further provided methods for producing such novel compound. It will further be understood that various changes may be made in proportions of ingredients of the compositions disclosed, in the solvent media employed, and in other conditions and factors, without departing from the principles of the invention, or the scope thereof as set forth in the accompanying claims.

I claim:

1. A method for preparing choline ascorbate comprising reacting ascorbic acid in the presence of an inert solvent medium with a substantially equimolar quantity of a member selected from the group consisting of (I) choline and (II) the choline-forming reagents trimethylamine and ethylene oxide, and separating the solvent from the reaction product.

2. The method as defined in claim 1 wherein the solvent medium is methanol.

3. A method of preparing choline ascorbate comprising reacting ascorbic acid and choline in substantialy equimolar quantities in the presence of a solvent medium and separating the solvent from the reaction product by distillation.

4. A method for the preparation of choline ascorbate comprising neutralizing ascorbic acid with trimethylamine in the presence of a solvent, introducing ethylene oxide into the resulting reaction medium, and separating the solvent medium from the reaction product, the ascorbic acid, trimethylamine and ethylene oxide being employed in substantially equimolar proportions.

5. The method as defined in claim 4 in which the solvent medium is methanol, and the methanol is separated from the reaction product by distillation.

6. A method for the preparation of choline ascorbate comprising dissolving choline in methanol, adding a suspension of ascorbic acid in methanol to said solution the amount of ascorbic acid being substantially equimolar with respect to the choline, treating the resulting reaction mass with carbon, filtering the treated solution, and distilling methanol from said solution to recover choline ascorbate.

7. A method for the preparation of choline ascorbate comprising suspending ascorbic acid in methanol, neutralizing said suspension by the addition of a methanol solution of trimethylamine, adding a methanol solution of ethylene oxide to the resulting reaction mass the ascorbic acid, trimethylamine and ethylene oxide being employed in substantially equimolar proportions, treating the resultant reaction mass with carbon, filtering the treated solution from said carbon, and distilling said solution to remove methanol and recover choline ascorbate.

8. A viscous liquid having a specific gravity of approximately 1.32 at 25° C., and ascorbic acid content of approximately 43.7% as determined by iodine titration, a choline content of approximately 65.4% as determined by Reineckate precipitation, and a nitrogen content of approximately 5.01 by Kjeldahl determination, said choline and ascorbic acid components being combined as choline ascorbate.

9. A stable aqueous solution containing choline and ascorbic acid components in substantially equimolar proportions, said choline and ascorbic acid components being combined as choline ascorbate.

10. A vitamin composition containing choline and ascorbic acid components in substantially equimolar proportions, said choline and ascorbic acid components being combined as choline ascorbate.

11. A vitamin composition containing a B-complex vitamin, and choline and ascorbic acid components in substantially equimolar proportions, said choline and ascorbic acid components being combined as choline ascorbate.

12. A vitamin composition containing vitamin B–12, and choline and ascorbic acid components in substantially equimolar proportions, said choline and ascorbic acid components being combined as choline ascorbate.

References Cited in the file of this patent

Bunatyan: Chem. Absts., vol. 37 (1943), pp. 6714 and 6715.

U. S. Dispensatory, 24th ed. (1947), p. 1400.

Howard: Modern Drug Encyclopedia, 5th ed. (1952), p. 1212.